US011502909B2

(12) United States Patent
Xu et al.

(10) Patent No.: US 11,502,909 B2
(45) Date of Patent: Nov. 15, 2022

(54) NETWORK SLICE MANAGEMENT METHOD AND APPARATUS

(71) Applicant: HUAWEI TECHNOLOGIES CO., LTD., Guangdong (CN)

(72) Inventors: Ruiyue Xu, Shanghai (CN); Kai Zhang, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/785,025

(22) Filed: Feb. 7, 2020

(65) Prior Publication Data
US 2020/0177460 A1 Jun. 4, 2020

Related U.S. Application Data

(63) Continuation of application No. PCT/CN2018/091660, filed on Jun. 15, 2018.

(30) Foreign Application Priority Data

Aug. 8, 2017 (CN) .......................... 201710672419.5

(51) Int. Cl.
H04L 41/0893 (2022.01)
H04L 41/0213 (2022.01)
(Continued)

(52) U.S. Cl.
CPC ...... H04L 41/0893 (2013.01); H04L 41/0213 (2013.01); H04L 45/02 (2013.01); H04W 84/042 (2013.01)

(58) Field of Classification Search
CPC ............. H04L 41/0806; H04L 41/5051; H04L 41/5054; H04L 41/0893; H04L 41/5048;
(Continued)

(56) References Cited

U.S. PATENT DOCUMENTS

2013/0311623 A1* 11/2013 Kanada ............... H04L 41/0806
709/221
2015/0358399 A1* 12/2015 Baugher ............. G06F 9/45558
709/203
(Continued)

FOREIGN PATENT DOCUMENTS

CN 103945493 A 7/2014
CN 104125091 A 10/2014
WO 2016192636 A1 12/2016

OTHER PUBLICATIONS

Voshinori Goto NTT Corporation Japan: "Output of DraftRecommendation Y.IMT2020-NetSoft: High level technical characteristicsof network softwarization for IMT-2020, 021 /13 meeting, Jul. 3-14, 201 ?;TDxx (WP 1 /13)",Jul. 12, 2017 (Jul. 12, 2017), pp. 1-61,XP044231586.
(Continued)

Primary Examiner — Djenane M Bayard
(74) Attorney, Agent, or Firm — Womble Bond Dickinson (US) LLP

(57) ABSTRACT

Embodiments of this application disclose a network slice management method and device, and relate to the field of communications technologies. The method includes: receiving, by a first management unit, a network slice management request, where the network slice management request carries instance information or indication information of a transport network manager; and sending, by the first management unit, a transmission management request to a corresponding transport network manager based on the instance information of the transport network manager, where the transmission management request is used to deploy a transmission network. The embodiments of this application provide a method for determining a transport network manager to create a corresponding transmission network.

16 Claims, 5 Drawing Sheets

(51) Int. Cl.
*H04L 45/02* (2022.01)
*H04W 84/04* (2009.01)

(58) Field of Classification Search
CPC . H04L 67/16; H04L 41/0813; H04L 41/0896; H04L 41/0843; H04L 41/12; H04L 67/10; H04L 67/12; H04L 41/0803; H04L 41/082; H04L 41/5003; H04L 41/5006; H04L 47/2408; H04L 47/805; H04L 67/141; H04L 67/303; H04L 29/08; H04L 41/042; H04L 41/044; H04L 41/0886; H04L 41/5041; H04L 41/5045; H04L 47/70; H04L 41/0246; H04L 41/046; H04L 41/145; H04L 41/32; H04L 41/50; H04L 41/5019; H04L 47/14; H04L 47/78; H04L 67/148; H04L 67/34; H04L 12/46; H04L 12/4633; H04L 12/4641; H04L 29/06; H04L 41/0213; H04L 41/0286; H04L 41/0631; H04L 41/0681; H04L 41/0823; H04L 41/0836; H04L 41/0846; H04L 41/0883; H04L 41/14; H04L 41/147; H04L 41/22; H04L 41/28; H04L 41/5009; H04L 41/5025; H04L 41/5067; H04L 41/5096; H04L 43/08; H04L 45/02; H04L 45/306; H04L 47/781; H04L 67/20; H04L 67/26; H04L 67/2842; H04L 67/32; H04L 41/40; H04L 41/0895; H04L 41/122; H04L 41/0897; H04L 41/342; H04L 65/40; H04L 41/0853; H04L 41/06; H04L 41/0816; H04L 43/0817; H04L 47/11; H04L 67/63; H04L 41/04; H04L 41/0889; H04L 41/0894; H04L 43/0823; H04L 47/787; H04L 63/0807; H04L 63/0823; H04L 69/322; H04L 12/1407; H04L 2101/668

See application file for complete search history.

(56) References Cited

U.S. PATENT DOCUMENTS

| | | | |
|---|---|---|---|
| 2016/0006623 | A1 | 1/2016 | Liu et al. |
| 2016/0316436 | A1 | 10/2016 | Dinan |
| 2017/0070892 | A1* | 3/2017 | Song .............. H04W 48/20 |
| 2017/0141973 | A1 | 5/2017 | Vrzic |
| 2018/0249530 | A1* | 8/2018 | Salkintzis ........ H04W 48/18 |
| 2019/0223093 | A1* | 7/2019 | Watfa .............. H04W 48/18 |
| 2019/0357131 | A1* | 11/2019 | Sivavakeesar ..... H04W 48/18 |
| 2020/0137552 | A1* | 4/2020 | Park ................ H04W 76/18 |

OTHER PUBLICATIONS

Yousaf Zarrar (nec) et al: "Definition of connectivity and QoE/QoSmanagement mechanisms—intermediate report—5G NORMA D5.1Deliverable",, Nov. 30, 2016 (Nov. 30, 2016), XP055348936,total 190 pages.

3GPP TR 28.801 V1.0.0,:"3rd Generation Partnership Project; Technical Specification GroupServices and System Aspects; Telecommunication management; Study onmanagement and orchestration of network slicing for next generationnetwork (Release 14)",Mar. 9, 2017 (Mar. 9, 2017), pp. 1-52,XP051290419.

Huawei, "Adding Use Case and Requirement for changing the location of network functions within a network slice instance", 3GPP TSG SA WG5 (Telecom Management) Meeting #111Bis, S5A-170143, Feb. 13-17, 2017, Munich (Germany), total 3 pages.

* cited by examiner

NETWORK SLICE MANAGEMENT METHOD AND APPARATUS

CROSS-REFERENCE TO RELATED APPLICATIONS

This application is a continuation of International Application No. PCT/CN2018/091660, filed on Jun. 15, 2018, which claims priority to Chinese Patent Application No. 201710672419.5, filed on Aug. 8, 2017. The disclosures of the aforementioned applications are hereby incorporated by reference in their entireties.

TECHNICAL FIELD

Embodiments of this application relate to the communications field, and in particular, to a network slice creation method and an apparatus.

BACKGROUND

Facing the future, mobile communications technologies and industries enters a 5th generation (5G) development phase. 5G will meet people's requirements for ultra-high traffic density, ultra-high connection density, ultra-high mobility, and the like, and can provide users with extremely good service experience of high-definition videos, virtual reality, augmented reality, cloud desktop, and the like. 5G will penetrate into such a field as internet of things and is deeply integrated with industrial facilities, medical instruments, and transportation means, to effectively meet information service requirements of vertical industries, such as manufacturing, medical, and transportation industries.

A conventional cellular network uses a "one-size-fits-all" network architecture, which has a dedicated support and information technology (IT) system and is suitable for a single-service type network. However, by using this vertical architecture, an operator has difficulty in extending a telecommunication network, and also has great difficulty in performing adjustment based on continuously changing user requirements, and meeting a requirement of a new-type use case. Therefore, in a 5G era, the conventional cellular network and a "one-size-fits-all" method needs to be adjusted to support thousands upon thousands of use cases, numerous user types, and use of various applications.

In a future 5G system, network resources are sliced, a single physical network may be divided into a plurality of logical virtual networks, and an independent network slice is allocated to a typical service scenario. In the slice, for a service requirement, a network architecture is enhanced, to optimize and implement resource configuration, so that a plurality of network slices may share a network infrastructure, thereby improving network resource utilization.

SUMMARY

Embodiments of this application provide a network slice management method and an apparatus, to resolve an existing problem of low efficiency in manually deploying a transmission network.

According to a first aspect, an embodiment of this application provides a network slice management method. The method includes the following operations.

A first management unit receives a network slice management request, where the network slice management request carries instance information or indication information of a transport network manager, and the indication information is used to determine the instance information of the transport network manager. When the first management unit is a network management unit, the network slice management request is a network slice creation request, a network slice instantiation request, a network slice modification request, a network slice scale-out request, a network slice configuration request, or the like. When the first management unit is a domain management unit, the network slice management request is a network slice subnet management request, and may include: a network slice subnet creation request, a network slice subnet instantiation request, a network slice subnet modification request, a network slice subnet scale-out request, a network slice subnet configuration request, or the like. The first management unit sends a transmission management request to a corresponding transport network manager based on the instance information of the transport network manager, where the transmission management request is used to deploy a transmission network. In one embodiment, the transmission network includes one or more of the following: a link, a local area network, a metropolitan area network, and a wide area network. Deploying the transmission network may include one or more of the following processes: creating the transmission network; instantiating the transmission network; configuring the transmission network; and allocating resources needed for the transmission network.

Compared with the prior art in which a transport network manager is determined through manual negotiation to deploy a transmission network, the embodiments of this application provide a method for quickly and automatically determining a transport network manager to deploy a corresponding transmission network to form a network slice, so that network slice deployment efficiency is improved, and quick service rollout is met.

In one embodiment, when the network slice management request carries the indication information of the transport network manager, before the first management unit sends the transmission management request to the corresponding transport network manager based on the instance information of the transport network manager, the first management unit determines the instance information of the transport network manager based on the indication information of the transport network manager.

In one embodiment, before the first management unit receives the network slice management request, the first management unit may receive instance information of at least one transport network manager. In one embodiment, the first management unit may send a request message to all or some transport network managers, so that these transport network managers send corresponding instance information. For example, when a new transport network manager is deployed in a network, the new transport network manager sends corresponding instance information to the first management unit. Alternatively, when the instance information of the transport network manager changes, for example, an IP address is updated, the transport network manager may send corresponding instance information to the first management unit. Alternatively, after the transport network manager is unavailable or is removed, the transport network manager notifies the first management unit. Therefore, the first management unit receives instance information of one or more transport network managers.

In one embodiment, the indication information of the transport network manager may include but is not limited to one or more of the following information: tenant information, a network slice type, a service type, location information, public land mobile network PLMN information, isolation requirement information, a latency, a bandwidth, and a throughput.

In one embodiment, the indication information of the transport network manager may include but is not limited to indication information of a network slice template, where the indication information of the network slice template is used to obtain the network slice template; and the network slice template includes instance information of the transport network manager.

In one embodiment, the instance information of the transport network manager may include but is not limited to one or more of the following: an identifier of the transport network manager, provider information of the transport network manager, a network address of the transport network manager, a service address of the transport network manager, and access security information of the transport network manager.

According to a second aspect, an embodiment of this application provides a network slice management method. The method includes the following operations. A second management unit receives a request message sent by a first management unit, where the request message carries indication information of a transport network manager; and the second management unit may be a default transport network manager or a management unit or an orchestration unit of the transport network manager, and the management unit or the orchestration unit of the transport network manager is configured to manage or maintain all transmission management. In one embodiment, the second management unit may be only a database storing the transport network managers. The second management unit determines instance information of a corresponding transport network manager based on the indication information of the transport network manager; and the second management unit sends the instance information of the corresponding transport network manager to the first management unit. The request message may include but is not limited to: a transport network manager query request message or a transmission management request message, where the transmission management request message includes but is not limited to: a transmission creation request, a transmission update request, or a transmission instantiation request.

The second management unit is introduced to manage or maintain instance information of all the transport network managers in a centralized manner. The first management unit interacts with the second management unit. In one aspect, implementation of the first management unit can be simplified; in the other aspect, the instance information of the management unit can be synchronized with maximum efficiency.

In one embodiment, before the second management unit receives the request message sent by the first management unit, the first management unit obtains instance information of at least one transport network manager. In one embodiment, the instance information of all or some of the transport network managers may be configured on the first management unit in a pre-configuration manner. In addition, a request message may also be sent to all or some of the transport network managers, so that these transport network managers report corresponding instance information, and the first management unit obtains the instance information of these transport network managers.

In one embodiment, the indication information of the transport network manager may include but is not limited to one or more of the following information: tenant information, a network slice type, a service type, location information, public land mobile network PLMN information, isolation requirement information, a latency, a bandwidth, and a throughput.

In one embodiment, the instance information of the transport network manager may include but is not limited to one or more of the following: an identifier of the transport network manager, provider information of the transport network manager, a network address of the transport network manager, a service address of the transport network manager, and access security information of the transport network manager.

According to a third aspect, an embodiment of this application provides a network slice management method. The method includes: determining, by a third management unit, instance information or indication information of a transport network manager, where the indication information is used to determine the instance information of the transport network manager; and sending, by the third management unit, a management request to a first management unit, where the management request carries the instance information or the indication information of the transport network manager, and the management request is used to instruct the first management unit to send a transmission management request to a transport network manager corresponding to the instance information or the indication information of the transport network manager.

The third management unit is introduced to implement a function of determining transport network managers in a centralized manner, and all the transport network managers are determined by the third management unit to implement uniform allocation of the transport network managers, thereby improving use efficiency of the transport network managers while improving efficiency of determining the transport network managers.

In one embodiment, the determining, by a third management unit, instance information or indication information of a transport network manager includes: receiving, by the third management unit, the instance information or the indication information of the transport network manager; or obtaining, by the third management unit, a network template or indication information of the network template, where the indication information of the network template is used to obtain the network template, and the network template includes the instance information or the indication information of the transport network manager.

In one embodiment, the indication information of the transport network manager includes one or more of the following information: tenant information, a network slice type, a service type, location information, public land mobile network PLMN information, isolation requirement information, a latency, a bandwidth, and a throughput.

In one embodiment, the instance information of the transport network manager includes one or more of the following: an identifier of the transport network manager, provider information of the transport network manager, a network address of the transport network manager, a service address of the transport network manager, and access security information of the transport network manager.

According to another aspect, an embodiment of this application provides a first management unit. As a network slice management apparatus, the first management unit may implement functions performed by the first management unit in the foregoing method examples. The functions may be implemented by hardware or may be implemented by executing corresponding software by the hardware. The hardware or the software includes one or more modules corresponding to the foregoing functions.

In one embodiment, a structure of the first management unit includes a processor and a communications interface. The processor is configured to support the first management unit in performing the corresponding functions in the foregoing method. The communications interface is configured to support communication between the first management unit and another network element. The first management unit may further include a memory. The memory is configured to couple to the processor. The memory stores a program instruction and data that are used for the first management unit.

According to still another aspect, an embodiment of this application provides a second management unit. As another network slice management apparatus, the second management unit may implement functions performed by the second management unit in the foregoing method embodiments. The functions may be implemented by hardware or may be implemented by executing corresponding software by the hardware. The hardware or the software includes one or more modules corresponding to the foregoing functions.

In one embodiment, a structure of the second management unit includes a processor and a communications interface. The processor is configured to support the second management unit in performing the corresponding functions in the foregoing method. The communications interface is configured to support communication between the second management unit and another network element. The second management unit may further include a memory. The memory is configured to couple to the processor. The memory stores a program instruction and data that are used for the second management unit.

According to yet another aspect, an embodiment of this application provides a communications system. The system includes the first management unit and the second management unit in the foregoing aspects.

According to still yet another aspect, an embodiment of this application provides a computer storage medium. The computer storage medium is configured to store a computer software instruction used by the foregoing first management unit, and includes a program designed for performing the foregoing aspects.

According to a further aspect, an embodiment of this application provides a computer storage medium. The computer storage medium is configured to store a computer software instruction used by the foregoing second management unit, and includes a program designed for performing the foregoing aspects.

Compared with the prior art in which a transport network manager is determined through manual negotiation to deploy a transmission network, the embodiments of this application provide a method for quickly and automatically determining a transport network manager to deploy a corresponding transmission network to form a network slice, so that network slice deployment efficiency is improved, and quick service rollout is met.

BRIEF DESCRIPTION OF DRAWINGS

FIG. 4-1 is a flowchart of another network slice management method according to an embodiment of this application;

FIG. 4-2 is a flowchart of another network slice management method according to an embodiment of this application;

DESCRIPTION OF EMBODIMENTS

Before technical solutions are described, to facilitate understanding of the technical solutions in the embodiments of this application, some terms in the embodiments of this application are first explained.

A network slice may also be referred to as a network slice instance, and is a combination of network function (NF) and resources that ensures that a carried service can meet a requirement of a service level agreement (SLA). Hard isolation (for example, physical isolation) or soft isolation (for example, logical isolation) may be performed on these NFs and resources based on different requirements, and each network slice is logically independent. The network slice may include at least a core network (CN) part, an access network (AN) part, and a transport network (TN) part, or may include any two or one of a CN part, an AN part, and a TN part.

In the embodiments of this application, the network slice is a broad concept, and may be a conventional network or a dedicated network. A network slice subnet is also a network slice.

A network slice subnet may be referred to as a network slice subnet instance, and is a combination of network functions and resources. Usually, the network slice subnet may be obtained by slicing a network slice, or a network slice may be directly used as the network slice subnet.

Concepts such as the network slice or the network slice subnet mentioned in this specification may be considered to be equivalent to the network slice instance or the network slice subnet instance.

A tenant refers to one or more network service users sharing a group of physical and virtual resources. The tenant may be a renter of an operator network. For example, an electric power company rents an operator network to deploy a smart meter reading service, and in this case, the electric power company is a tenant of the operator.

Figure 1:
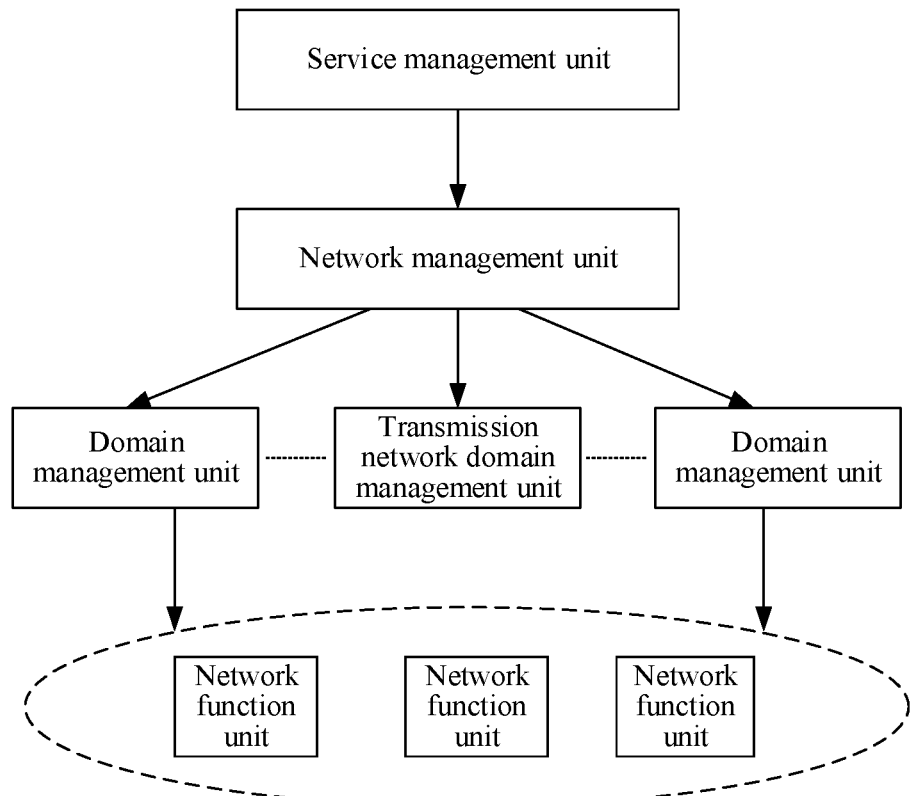
FIG. 1 is a simplified schematic diagram of a network architecture according to an embodiment of this application.

FIG. 1 shows a network architecture to which an embodiment of this application is applied. A transmission network management method provided in this embodiment of this application may be implemented by function units in the network architecture shown in FIG. 1, and the network architecture may be deployed in a 5G system. The following describes in detail each function unit in the network architecture shown in FIG. 1.

As shown in FIG. 1, the network architecture may include a service management function (SM), a network management unit (NM), a domain management unit (DM), a transport network manager (TNM), and the like.

The SM is a service management unit, and is mainly configured to receive a service requirement of a related tenant, convert the service requirement into a requirement related to a network slice, and perform service management. The SM may be deployed in an operation support system (OSS), or may be deployed outside the OSS. The SM may be a management unit or an operation unit of the tenant. The SM may be independently deployed, or may be integrated into a management unit (for example, a business support system (BSS), a service management unit, a service orchestration unit, or a service management and orchestration unit). It should be noted that the SM is not limited to the name shown in FIG. 1, and the SM may alternatively be named as follows: a client service management function (also as customer service management function) or a communication service management function (CSMF)).

The NM includes one or both of an end-to-end network management function and an end-to-end network orchestration function, and may have some or all of the following functions: end-to-end network management (for example, network lifecycle management, network template management, network fault management, network performance management, and network configuration management); mapping between an end-to-end network, a subnet, and an end-to-end network and a network function; network resources provided by different domains (for example, an access network domain, a core network domain, and a transport domain) or sub-SLA coordination; decomposing network requirement information as subnet requirement information; and uniform orchestration of subnets and network functions that are provided by subdomains, which enable the subnets or network functions that are provided by different subdomains to meet a target service or network requirement (for example, a requirement of an SLA, a requirement of a key performance indicator (KPI), and a requirement of quality of service (QoS)). The NM may be deployed in the OSS, or may be deployed outside the OSS. The NM may be independently deployed, or may be integrated into a management unit (for example, a network orchestration unit, a network management and orchestration unit, a service management unit, a service orchestration unit, a service management and orchestration unit, or a network functions virtualization orchestrator (NFVO)). It should be noted that the NM is not limited to the name shown in FIG. 1, and the NM may alternatively be named as follows: a cross-domain management unit, a cross-domain network slice management unit, a network slice management function (NSMF), or the like.

The DM includes one or both of a subnet management function and an orchestration function, and may have some or all of the following functions: domain management, for example, which may include subnet lifecycle management (creation, update, and deletion), subnet fault management, subnet performance management, and subnet configuration management; service management (including service lifecycle management, service fault management, service performance management, service configuration management, and the like); and coordination between network resources, for example, the NF or a network element (NE), for uniform orchestration. The DM may be deployed in the OSS, or may be deployed outside the OSS. The DM may be independently deployed, or may be integrated into a management unit (for example, a network management unit, a network orchestration unit, a network management and orchestration unit, an element management unit, a network function management unit, a service management unit, a service orchestration unit, a domain management unit, a service management and orchestration unit, or an NFVO). It should be noted that the DM is not limited to the name shown in FIG. 1, and the DM may alternatively be named as follows: a domain slice management unit, a network slice subnet management function (NSSMF), or the like.

In one embodiment, a subnet managed by the DM may include one or more of the following parts: an AN part, a CN part, and a TN part. When the subnet managed by the DM includes only the AN part, it may be considered that the subnet management unit is an AN DM. When the subnet managed by the DM includes only the CN part, it may be considered that the subnet management unit is a CN DM. When the subnet managed by the DM includes the AN part and the CN part, it may be considered that the subnet management unit is a Mix DM.

The TNM includes one or both of a transmission network management function and a transmission network orchestration function, and may have some or all of the following functions: transmission network part management, for example, may include transmission network part lifecycle management (creation, update, and deletion), transmission network part fault management, transmission network part performance management, transmission network part configuration management, and the like. The TNM may be deployed in the OSS, or may be deployed outside the OSS. The TNM may be independently deployed, or may be integrated into a management unit (for example, a network management unit, a network orchestration unit, a network management and orchestration unit, a domain management unit, a network element management unit, a service management unit, a service orchestration unit, a domain management unit, a service management and orchestration unit, or an NFVO). It should be noted that the TNM is not limited to the name shown in FIG. 1, and the TNM may alternatively be named as: a (transmission network) subnet management unit, a network slice transmission network management unit, or the like.

FIG. 1 is merely a diagram of an example architecture. In addition to function nodes shown in FIG. 1, the network architecture may further include another function node. This is not limited in this embodiment of this application.

Figure 2:
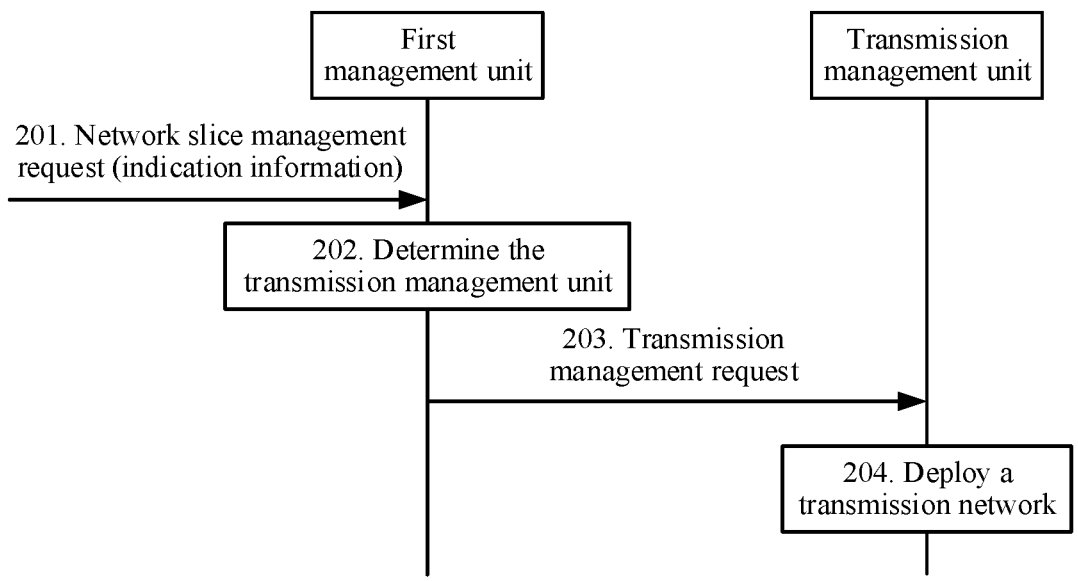
FIG. 2 is a flowchart of a network slice management method according to an embodiment of this application.

FIG. 2 shows a network slice management method according to an embodiment of this application. The method may be applied to the network architecture shown in FIG. 1, and a method is as follows:

S201. A first management unit receives a network slice management request, where the network slice management request carries instance information or indication information of a transport network manager.

The first management unit may be the NM shown in FIG. 1, or may be the DM.

When the first management unit is the NM, the network slice management request may include any one of the following: a network slice creation request, a network slice instantiation request, a network slice modification request, a network slice scale-out request, a network slice configuration request, and the like.

When the first management unit is the DM, the network slice management request is a network slice subnet management request, and may include any one of the following: a network slice subnet creation request, a network slice subnet instantiation request, a network slice subnet modification request, a network slice subnet scale-out request, a network slice subnet configuration request, and the like.

The following uses an example in which the first management unit is the NM for description.

A network slice management request message may be used to request the NM to manage a network slice, and the network slice management request message may carry the instance information of the transport network manager, and may alternatively carry the indication information. When the indication information is carried, the indication information is used to determine the instance information of the transport network manager.

The instance information of the transport network manager may include one or more of the following: an identifier of the transport network manager, provider information of the transport network manager, a network address of the transport network manager, a service address of the transport network manager, and access security information of the transport network manager.

The indication information of the transport network manager may include one or more of the following information: tenant information, a network slice type, a service type, location information, public land mobile network (PLMN) information, isolation requirement information, a latency, a bandwidth, and a throughput. The network slice type may include enhanced mobile broadband (eMBB), massive internet of things (mIoT), and an ultra-reliable and low-latency communication (URLLC).

In one embodiment, the indication information of the transport network manager may include indication information of a network slice template. The indication information of the network slice template is used to obtain the network slice template, and the network slice template includes the instance information of the transport network manager. The indication information of the network slice template may include one or more of the following information: an identifier of the network slice template, network slice requirement information, provider information of the network slice template, and version information of the network slice template. The network slice requirement information includes one or more of the following information: a latency, coverage, a quantity of users, and a network slice type.

For example, when an internet of vehicles enterprise rents a network of an operator to implement a self-driving service, the internet of vehicles enterprise signs a related agreement with the operator; and a service management system of the operator sends a network slice creation request to an NM, and the network slice creation request is used to request the NM to create or allocate a corresponding network slice instance to support the self-driving service of the internet of vehicles enterprise. In one embodiment, service requirement information may be determined in the following manners.

In one manner: The network slice creation request carries the network slice requirement information, and the network slice requirement information includes: a network slice type being a low-latency network slice, a location area being Shanghai, a quantity of users being 100,000, or the like.

In another manner: The network slice creation request carries the indication information of the network slice template. The network slice template indicated by the indication information of the network slice template includes: a network slice type being a low-latency network slice, a location area being Shanghai, a quantity of users being 100,000, or the like.

In still another manner: The network slice creation request carries the indication information of the network slice template. The network slice template indicated by the indication information of the network slice template includes the instance information of the transport network manager, namely, an identifier or an IP address of the transport network manager.

In one embodiment, the network slice management request message may include instance information or indication information of a plurality of transport network managers.

In one embodiment, when the indication information of the transport network manager is the indication information of the network slice template, the network slice template includes the instance or indication information of the plurality of transport network managers.

For example, if the network slice includes a network slice subnet 1, a network slice subnet 2, and a network slice subnet 3, the network slice management request or the network slice template may include: transmission between the network slice subnet 1 and the network slice subnet 2 being managed by a transport network manager corresponding to instance information 1 or indication information 1 of the transport network manager, and transmission between the network slice subnet 2 and the network slice subnet 3 being managed by a transport network manager corresponding to instance information 2 or indication information 2 of the transport network manager.

In one embodiment, before S201, the NM may first obtain instance information of all or some transport network managers. Further, the NM may further store the instance information of these transport network managers. When the NM stores the instance information of these transport network managers, the NM may directly locally obtain the instance information of these transport network managers next time, to quickly select an available transport network manager, thereby reducing signaling operations of obtaining the instance information of the transport network manager.

A manner in which the NM obtains the instance information of the transport network manager may include but is not limited to the following several manners.

In one embodiment, the instance information of the transport network manager is preconfigured on the NM, and operation and maintenance personnel or another management unit sends, to the NM, instance information of transport network managers that can be accessed by the NM, to instruct the NM to send a transmission management request to a transport network manager corresponding to the instance information of these transport network managers.

In one embodiment, the transport network manager reports corresponding instance information to a corresponding NM. For example, after a new transport network manager is deployed in a network, the new transport network manager sends corresponding instance information to a corresponding NM. Alternatively, when the instance information of the transport network manager changes, for example, an IP address is updated, the transport network manager may send new instance information to a corresponding NM. Alternatively, after the transport network manager is unavailable or is removed, the transport network manager notifies a corresponding NM.

S202. The first management unit determines a corresponding transport network manager based on the instance information or the indication information of the transport network manager.

The NM may determine a specific transport network manager by using the instance information or the indication information of the transport network manager, so that the NM can send a transmission management request to the determined transport network manager, to enable the transport network manager to create a transmission network.

When the network slice management request carries the instance information of the transport network manager, that determining the corresponding transport network manager in S202 is directly obtaining the instance information of the transport network manager in the network slice management request, so that the corresponding transport network manager is determined.

In one embodiment, the NM may alternatively first obtain the indication information of the network slice template by using the network slice creation request, and then obtain the network slice template by using the indication information of the network slice template. The network slice template may include the instance information of the transport network manager, so that the NM obtains the instance information of the transport network manager by obtaining the network slice template, and further determines the corresponding transport network manager.

The NM may alternatively determine the corresponding transport network manager based on the indication information of the transport network manager, which includes: selecting, by the NM based on the indication information of the transport network manager, instance information of one transport network manager from pre-stored instance information of one or more transport network managers, to further determine the transport network manager.

Therefore, an appropriate transport network manager is determined based on the indication information of the transport network manager.

When the indication information of the transport network manager includes the network slice type, the NM determines the instance information of the corresponding transport network manager based on the network slice type. For example, when the network slice type is URLLC, the NM selects a transport network manager that provides URLLC transmission; if the network slice type is mIoT, the NM selects a transport network manager that provides mIoT transmission; or if the network slice type is eMBB, the NM selects a transport network manager that provides eMBB transmission.

When the indication information of the transport network manager includes the location information, the NM determines the instance information of the corresponding transport network manager based on received location information. For example, if the location information indicates that a slice is deployed in an area 1, the NM determines that a transport network manager in the area 1 is the transport network manager.

When the indication information of the transport network manager includes the bandwidth, the NM determines the instance information of the corresponding transport network manager based on received bandwidth requirement information. For example, if bandwidth requirement is high, a transport network manager managing a high bandwidth is selected as the transport network manager; or if bandwidth requirement is low, a transport network manager managing a low bandwidth is selected as the transport network manager.

It may be understood that when the indication information of the transport network manager includes the foregoing plurality of types of information, for example, includes the network slice type and the location information, the NM determines a transport network manager that meets a specific network slice type and specific location information.

It may be understood that the NM may obtain the instance information of the corresponding transport network manager based on the indication information. In other words, it may be considered that the NM determines the corresponding transport network manager.

When the network slice management request carries instance information or indication information of a plurality of transport network managers, a transport network manager that meets a condition may be determined based on instance information or indication information of each transport network manager. The method for determining the transport network manager based on the instance information or the indication information of the transport network manager has been described in detail above, and is not described herein again. A sequence of determining, based on the instance information or the indication information of each transport network manager, a transport network manager corresponding to the instance information or the indication information is not limited. It may be understood that the sequence may be determined based on an urgency degree of a service requirement, a priority of a task requirement, or the like.

S203. The first management unit sends a transmission management request to a corresponding transport network manager based on the instance information of the transport network manager, where the transmission management request is used to deploy a transmission network.

The transmission management request carries transmission network requirement information. The transmission network requirement information may be link requirement information between nodes, for example, may be a bandwidth, a latency, or an isolation requirement.

The NM may determine the transmission network requirement information based on the network slice requirement information.

It is assumed that a latency requirement carried in the network slice requirement information is 10 ms, the NM decomposes, based on a preset policy or algorithm, the latency requirement into the following: a latency requirement of a node 1 being 3 ms, a latency requirement of a node 2 being 3 ms, and a transmission requirement between the node 1 and the node 2 being 4 ms. The node may be a network function or a network slice subnet.

In one embodiment, the NM may alternatively obtain the network slice template based on the network slice requirement information. As described in the network slice template, a latency requirement of a node 1 is 3 ms, a latency requirement of a node 2 is 3 ms, and a transmission requirement between the node 1 and the node 2 is 4 ms. The node may be a network function or a network slice subnet.

S204. The transport network manager receives the transmission management request, and deploys a corresponding transmission network based on the transmission network requirement information.

Deploying the corresponding transmission network based on the transmission network requirement information may include the following several implementations.

In one implementation: The transport network manager determines, based on the transmission network requirement information, whether there is an available transmission network in a live network. If there is the available transmission network in the live network, the transmission network is directly used to meet transmission requirement information; otherwise, a new transmission network is created or instantiated to meet the transmission requirement information.

In another implementation: The transport network manager matches a pre-stored transmission network template based on the transmission network requirement information, and creates or deploys a transmission network based on the transmission network template. The transmission network template includes one or more of the following information: bottom-layer network resource required by the transmission network, a script or a workflow for creating or instantiating the transmission network, and a policy for creating or instantiating the transmission network.

In another implementation: The transport network manager determines or creates, based on the transmission requirement information, a virtual local area network (VLAN) that meets the transmission requirement information, and obtains information about the virtual local area network, for example, may obtain a virtual local area network address (e.g. VLAN Id).

In one embodiment, the transmission network includes one or more links, the links represent a direct connection requirement of two nodes, and the transmission network management unit creates or instantiates each link. The transmission network may include: a link, a local area network, a metropolitan area network, a wide area network, or the like.

The NM sends the transmission network requirement information to the determined transport network manager. For example, the NM may determine the corresponding transport network manager based on the instance information of the transport network manager, to send the transmission network requirement information to the corresponding transport network manager. Alternatively, the NM may send, based on the indication information of the transport network manager, for example, a network address of the transport network manager, the transmission network requirement information to the transport network manager corresponding to the network address of the transport network manager.

The NM may automatically determine, based on the instance information or the indication information of the transport network manager, a transport network manager that meets a condition without manual intervention and analysis and improves network deployment efficiency, thereby implementing a full automatic network deployment process.

Figure 3:
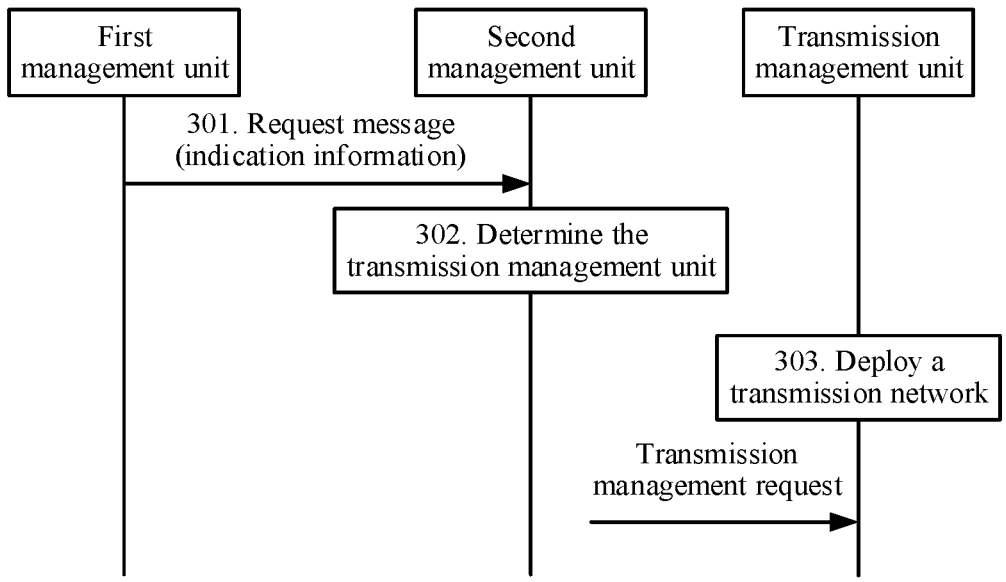
FIG. 3 is a flowchart of another network slice management method according to an embodiment of this application.

FIG. 3 shows still another network transmission management method according to an embodiment of this application. A main difference from the foregoing embodiment lies in that in this embodiment, a corresponding transport network manager is determined by using another management network element. In one embodiment, the method may include the following operations.

S301. A second management unit receives a request message sent by a first management unit, where the request message carries indication information of a transport network manager.

In this embodiment, the first management unit may be the NM shown in FIG. 1, or may be the DM. The second management unit may be a default transport network manager or a management unit or an orchestration unit of the transport network manager, and the management unit or the orchestration unit of the transport network manager is configured to uniformly manage or maintain the transport network manager. In one embodiment, the second management unit may be only a database storing the transport network manager.

The request message may include but is not limited to: a transport network manager query request message or a transmission management request message, where the transmission management request message includes a transmission creation request, a transmission update request, or a transmission instantiation request.

The indication information of the transport network manager may include one or more of the following information: tenant information, a network slice type, a service type, location information, public land mobile network PLMN information, isolation requirement information, a latency, a bandwidth, and a throughput. The network slice type may include enhanced mobile broadband (eMBB), massive internet of things (mIoT), and an ultra-reliable and low-latency scenario (URLLC).

S302. The second management unit determines instance information of a corresponding transport network manager based on the indication information of the transport network manager.

For a manner of determining the instance information of the corresponding transport network manager, refer to the implementation method in the foregoing embodiment.

S303. The transport network manager receives a transmission management request, where the transmission management request includes transmission network requirement information. The transport network manager deploys a corresponding transmission network based on the transmission network requirement information, which includes allocating a network resource for connecting nodes.

There may be the following implementations.

Figures 1, 4:
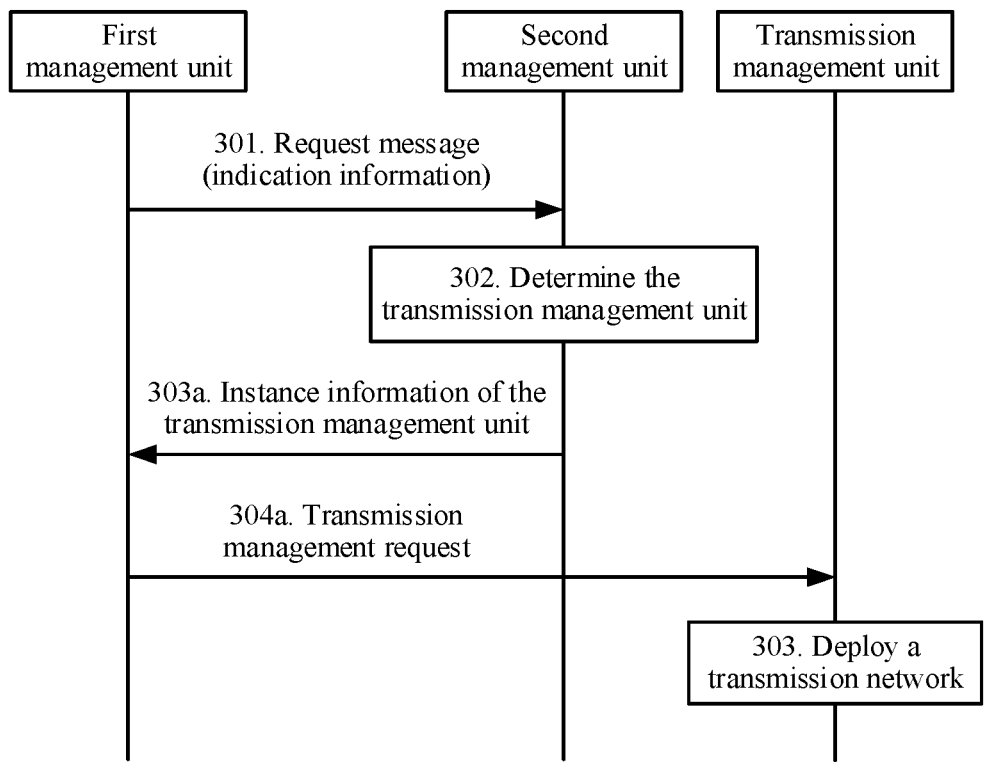
Figures 2, 4:
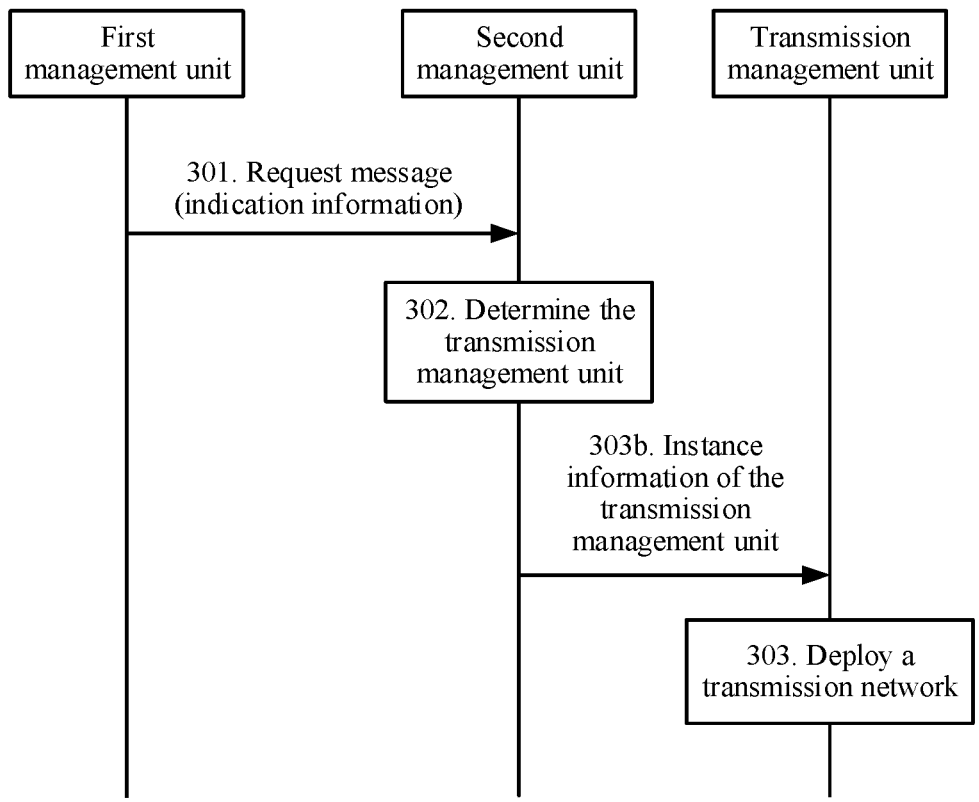

Implementation 1: Details are Shown in FIG. 4-1.

S303a. The second management unit sends the instance information of the corresponding transport network manager to the first management unit.

S304a. After obtaining the instance information of the transport network manager, the first management unit sends the transmission management request message to a transport network manager indicated by the instance information of the transport network manager, where the management request message is used to deploy a transmission network.

The transmission management request message carries transmission requirement information, where the transmission requirement information includes one or more of the following information: a latency, a bandwidth, and an isolation requirement.

Implementation 2: Details are Shown in FIG. 4-2.

S303b. The second management unit sends the transmission management request to a transport network manager corresponding to the instance information of the determined transport network manager, where the management request message is used to deploy the transmission network.

The transmission management request message carries transmission requirement information, where the transmission requirement information includes one or more of the following information: a latency, a bandwidth, and an isolation requirement.

The second management unit is introduced to manage or maintain instance information of all transport network managers in a centralized manner. The first management unit interacts with the second management unit. In one aspect, implementation of the first management unit can be simplified; and in the other aspect, the instance information of the management unit can be synchronized with maximum efficiency.

The foregoing describes the solutions in the embodiments of this application mainly from a perspective of interaction between network elements. It may be understood that to implement the foregoing functions, the network elements, such as the first management unit and the second management unit, include a corresponding hardware structure and/or a corresponding software module for performing the functions. A person skilled in the art should be easily aware that, in combination with the examples described in the embodiments disclosed in this specification, units, and algorithm operations may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first management unit, the second management unit, and the like, may be divided into function modules based on the foregoing method examples. For example, the function modules may be obtained through division based on the corresponding functions, or two or more functions may be integrated into one processing module. The integrated module may be implemented in a form of hardware, or may be implemented in a form of a software function module. It should be noted that, in the embodiments of this application, module division is an example, and is merely logical function division. In actual implementation, another division manner may be used.

Figure 5:
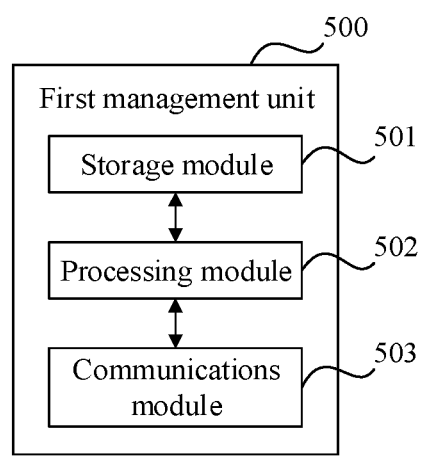
FIG. 5 is a schematic structural diagram of a management unit according to an embodiment of this application.

When the integrated module is used, FIG. 5 is a possible schematic structural diagram of a first management unit according to the foregoing embodiments. The first management unit may exist in a product form of a chip. The first management unit 500 includes a processing module 502 and a communications module 503. The processing module 502 is configured to control and manage an action of the first management unit. For example, the processing module 502 is configured to support the first management unit in performing the processes 201, 202, and 203 in FIG. 2, the process 301 in FIG. 3, and the processes 301, 301a, and 304a in FIG. 4-1 and FIG. 4-2, and/or is configured to perform another process of the technology described in this specification. The communications module 503 is configured to support communication between the first management unit and another network entity, for example, communication between the first management unit and a second management unit. The first management unit may further include a storage module 501. The storage module 501 is configured to store program code and data of the first management unit.

The processing module 502 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 503 may be a communications interface, a transceiver, a transceiver circuit, or the like. The communications interface is a collective term and may include one or more interfaces. The storage module 501 may be a memory.

Figure 6:
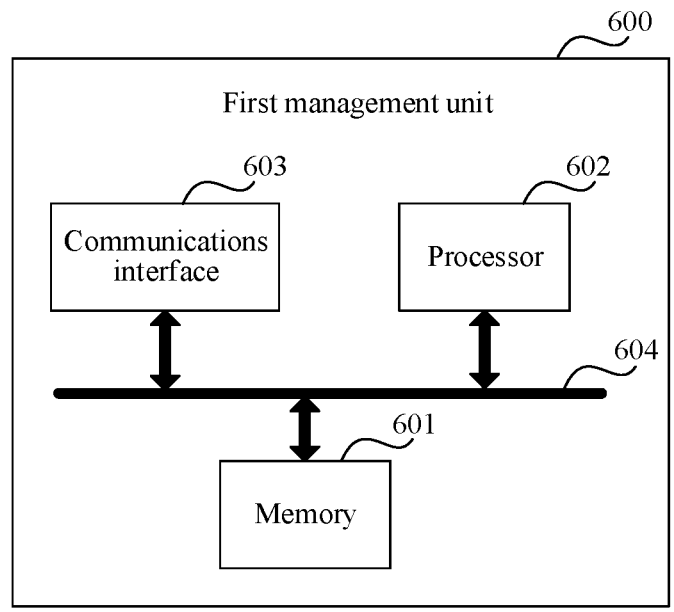
FIG. 6 is a schematic structural diagram of another management unit according to an embodiment of this application.

When the processing module 502 is a processor, the communications module 503 is a communications interface, and the storage module 501 is a memory, the first management unit in this embodiment of this application may be a first management unit shown in FIG. 6. Referring to FIG. 6, the first management unit 600 includes a processor 602, a communications interface 603, and a memory 601. In one embodiment, the first management unit 600 may further include a bus 604. The communications interface 603, the processor 602, and the memory 601 are interconnected by using the bus 604. The bus 604 may be a peripheral component interconnect (PCI) bus, an extended industry standard architecture (EISA) bus, or the like. The bus 604 may be classified into an address bus, a data bus, a control bus, and the like. For ease of representation, only one thick line is used to represent the bus in FIG. 6, but this does not mean that there is only one bus or only one type of bus.

Figure 7:
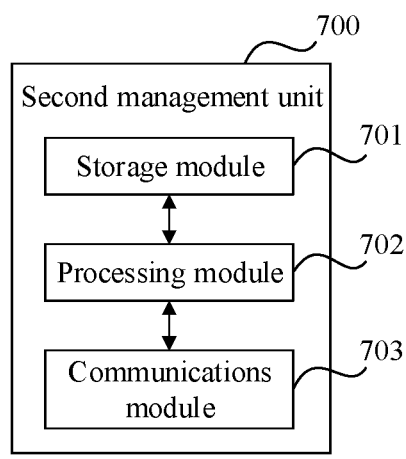
FIG. 7 is a schematic structural diagram of another management unit according to an embodiment of this application.

When the integrated module is used, FIG. 7 is a possible schematic structural diagram of a second management unit or a third management unit according to the foregoing embodiments. Both the second management unit and the third management unit may exist in a product form of a chip. In one embodiment, the second management unit is used as an example for description. The second management unit 700 includes a processing module 702 and a communications module 703. The processing module 702 is configured to control and manage an action of the second management unit. For example, the processing module 702 is configured to support the second management unit in performing the processes 301 and 302 in FIG. 3, and the processes 301, 302, 303a, and 303b in FIG. 4-1 and FIG. 4-2, and/or is configured to perform another process of the technology described in this specification. The communications module 703 is configured to support communication between the second management unit and another network entity, for example, communication between the second management unit and a first management unit. The second management unit may further include a storage module 701. The storage module 701 is configured to store program code and data of the second management unit.

The processing module 702 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 703 may be a communications interface, a transceiver, a transceiver circuit, or the like. The communications interface is a collective term and may include one or more interfaces. The storage module 701 may be a memory.

Figure 8:
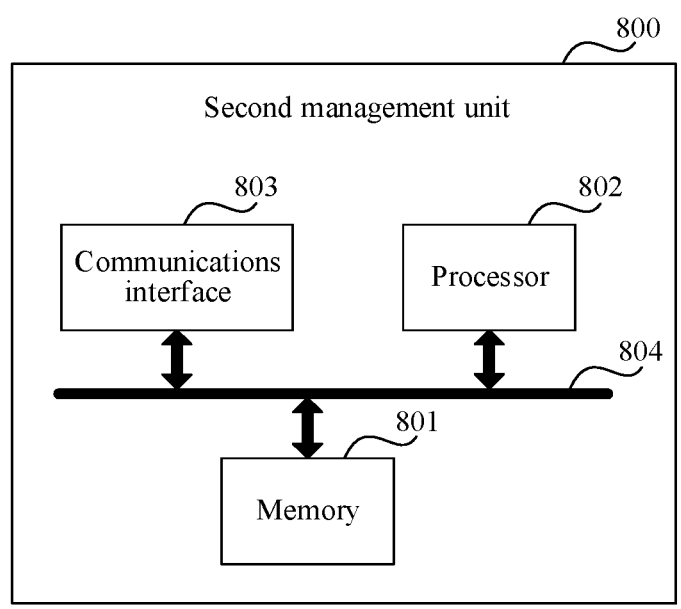
FIG. 8 is a schematic structural diagram of another management unit according to an embodiment of this application.

When the processing module 702 is a processor, the communications module 703 is a communications interface, and the storage module 701 is a memory, the second management unit in the embodiments of this application may be a second management unit shown in FIG. 8.

Referring to FIG. 8, the second management unit 800 includes a processor 802, a communications interface 803, and a memory 801. In one embodiment, the second management unit 800 may further include a bus 804. The communications interface 803, the processor 802, and the memory 801 are interconnected by using the bus 804. The bus 804 may be a peripheral component interconnect (PCI) bus, an extended industry standard architecture (EISA) bus, or the like. The bus 804 may be classified into an address bus, a data bus, a control bus, and the like. For ease of representation, only one thick line is used to represent the bus in FIG. 8, but this does not mean that there is only one bus or only one type of bus.

Method or algorithm operations described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and benefits of this application are further described in detail in the foregoing embodiments. It should be understood that the foregoing descriptions are merely embodiments of this application, but are not intended to limit the protection scope of this application. Any modification, equivalent replacement, or improvement made based on technical solutions of this application shall fall within the protection scope of this application.

What is claimed is:

1. A network slice management method comprising:
   receiving, by a first management unit, a network slice management request, wherein the network slice management request carries instance information or indication information of a transport network manager, and the indication information is used to determine the instance information of the transport network manager; and
   sending, by the first management unit, a transmission management request to a corresponding transport network manager based on the instance information of the transport network manager, wherein the transmission management request is used to deploy a transmission network, wherein the indication information of the transport network manager comprises: tenant information, a network slice type, a service type, location information, and a bandwidth, wherein the indication information of the transport network manager further includes indication information of a network slice template, wherein the indication information of the network slice template is used to obtain the network slice template, and, the network slice template includes the instance information of the transport network manager and the indication information of the network slice template includes network slice requirement information including network slice type, latency, coverage, and quantity of users.

2. The method according to claim 1, wherein, when the network slice management request carries the indication information of the transport network manager, before the sending, by the first management unit, a transmission management request to a corresponding transport network manager based on the instance information of the transport network manager, the method further comprises:
   determining, by the first management unit, the instance information of the transport network manager based on the indication information of the transport network manager.

3. The method according to claim 1, wherein, before the receiving, by a first management unit, a network slice management request, the method further comprises: receiving, by the first management unit, instance information of at least one transport network manager.

4. The method according to claim 1, wherein the instance information of the transport network manager comprises one or more of: an identifier of the transport network manager, provider information of the transport network manager, a network address of the transport network manager, a service address of the transport network manager, and access security information of the transport network manager.

5. The method according to claim 1, further comprising:
   determining, by a third management unit, instance information or indication information of the transport network manager; and
   sending, by the third management unit, the network slice management request to the first management unit, wherein the network slice management request carries the instance information or the indication information of the transport network manager.

6. The method according to claim 1, wherein
   the first management unit comprises network management (NM) or domain management (DM).

7. A network management unit comprising:
   at least one processor; and
   non-transitory computer-readable storage medium coupled to the at least one processor storing programming instructions for execution by the at least one processor, the programming instructions to instruct the at least one processor to:
   receive a network slice management request, wherein the network slice management request carries instance information or indication information of a transport network manager, and the indication information is used to determine the instance information of the transport network manager; and
   send a transmission management request to a corresponding transport network manager based on the instance information of the transport network manager, wherein the transmission management request is used to deploy a transmission network, wherein the indication information of the transport network manager comprises: tenant information, a network slice type, a service type, location information, and a bandwidth, wherein the indication information of the transport network manager further includes indication information of a network slice template, wherein the indication information of the network slice template is used to obtain the network slice template, and, the network slice template includes the instance information of the transport network manager and the indication information of the network slice template includes network slice requirement information including network slice type, latency, coverage, and quantity of users.

8. The network management unit according to claim 7, wherein, when the network slice management request carries the indication information of the transport network manager, before the network management unit sends the transmission management request to the corresponding transport network manager based on the instance information of the transport network manager, the at least one processor is configured to:
  determine the instance information of the transport network manager based on the indication information of the transport network manager.

9. The network management unit according to claim 7, wherein the at least one processor is configured to: receive instance information of at least one transport network manager.

10. The network management unit according to claim 7, wherein the indication information of the transport network manager comprises indication information of a network slice template, wherein the indication information of the network slice template is used to obtain the network slice template; and
  the network slice template comprises the instance information of the transport network manager.

11. The network management unit according to claim 7, wherein the instance information of the transport network manager comprises one or more of: an identifier of the transport network manager, provider information of the transport network manager, a network address of the transport network manager, a service address of the transport network manager, and access security information of the transport network manager.

12. A system for network slice management comprising:
  a first management unit, wherein the first management unit comprises network management (NM) or domain management (DM);
  a third management unit configured to determine instance information of a transport network manager or indication information and to send a management request to the first management unit, wherein the management request carries the instance information of the transport network manager or indication information, and
  wherein, the first management unit is configured to receive the management request, wherein the indication information is for determining the instance information of the transport network manager, and to send a transmission management request to a corresponding transport network manager based on the instance information of the transport network manager, wherein the transmission management request is for deploying a transmission network, wherein the indication information of the transport network manager comprises: tenant information, a network slice type, a service type, location information, and a bandwidth, wherein the indication information of the transport network manager further includes indication information of a network slice template, wherein the indication information of the network slice template is used to obtain the network slice template, and, the network slice template includes the instance information of the transport network manager and the indication information of the network slice template includes network slice requirement information including network slice type, latency, coverage, and quantity of users.

13. The system according to claim 12, wherein
  the first management unit is configured to determine the instance information of the transport network manager based on the indication information of the transport network manager.

14. The system according to claim 12, wherein
  the first management unit is configured to receive instance information of at least one transport network manager.

15. The system according to claim 12, wherein the indication information of the transport network manager comprises indication information of a network slice template, wherein the indication information of the network slice template is used to obtain the network slice template; and
  the network slice template comprises the instance information of the transport network manager.

16. The system according to claim 12, wherein the instance information of the transport network manager comprises one or more of: an identifier of the transport network manager, provider information of the transport network manager, a network address of the transport network manager, a service address of the transport network manager, and access security information of the transport network manager.

* * * * *